United States Patent

Stevens et al.

Patent Number: 6,086,094
Date of Patent: Jul. 11, 2000

[54] AIR BAG INFLATOR

[75] Inventors: Halley O. Stevens; Thomas H. Deming, both of Mesa, Ariz.

[73] Assignee: TRW Inc., Lyndhurst, Ohio

[21] Appl. No.: 09/064,868

[22] Filed: Apr. 22, 1998

[51] Int. Cl.$^7$ .................................................. B60R 21/28
[52] U.S. Cl. ............................................ 280/741; 280/737
[58] Field of Search ................................ 280/728.1, 737, 280/741, 729, 731, 736, 742, 743.1

[56] References Cited

U.S. PATENT DOCUMENTS

| | | | |
|---|---|---|---|
| 4,289,327 | 9/1981 | Okada . | |
| 5,161,776 | 11/1992 | Nicholson . | |
| 5,351,988 | 10/1994 | Bishop et al. | 280/737 |
| 5,470,104 | 11/1995 | Smith et al. | 280/737 |
| 5,487,561 | 1/1996 | Mandzy et al. | 280/741 |
| 5,607,181 | 3/1997 | Richardson et al. | 280/737 |
| 5,779,266 | 7/1998 | Moore et al. | 280/737 |
| 5,857,699 | 1/1999 | Rink et al. | 280/737 |
| 5,863,066 | 1/1999 | Blumenthal | 280/737 |
| 5,879,025 | 3/1999 | Blumenthal | 280/741 |
| 5,884,938 | 3/1999 | Rink et al. | 280/741 |
| 5,897,136 | 4/1999 | Okada | 280/737 |

*Primary Examiner*—Eric Culbreth
*Assistant Examiner*—L. Lum
*Attorney, Agent, or Firm*—Tarolli, Sundheim, Covell, Tummino & Szabo L.L.P.

[57] ABSTRACT

An apparatus (10) for inflating an inflatable vehicle occupant protection device (12) comprises an inflator structure (14) defining a primary chamber (18), a secondary chamber (48), a primary outlet (50) for enabling fluid flow from the primary chamber to the secondary chamber, and a secondary outlet (70) for directing fluid flow from the secondary chamber to the inflatable device. A primary burst disk (60) extends across the primary outlet (50). The primary burst disk (60) is rupturable in response to the pressure differential across the primary burst disk exceeding a first predetermined pressure differential. A secondary burst disk (80) extends across the secondary outlet (70) and is rupturable in response to the pressure differential across the secondary burst disk exceeding a second predetermined pressure differential. Inflation fluid (20) is stored at a first pressure in the primary chamber (18). Inflation fluid (90) is stored in the secondary chamber (48) at a second pressure less than the first pressure, so that the pressure differential across the primary burst disk (60) is less than the first predetermined pressure differential. The apparatus includes actuatable means (16) for rupturing the secondary burst disk (80) to initiate flow of inflation fluid (90) out of the secondary chamber (48) into the inflatable device (12). The flow of fluid (90) from the secondary chamber (48) decreases the pressure in the secondary chamber sufficiently to raise the pressure differential across the primary burst disk (60) to a level exceeding the first predetermined pressure differential. In a preferred embodiment, the actuatable means (16) is an energizable device for, when energized, increasing the pressure in the secondary chamber (48) to a level exceeding the second predetermined pressure differential, thereby effecting rupturing of the secondary burst disk (80).

10 Claims, 3 Drawing Sheets

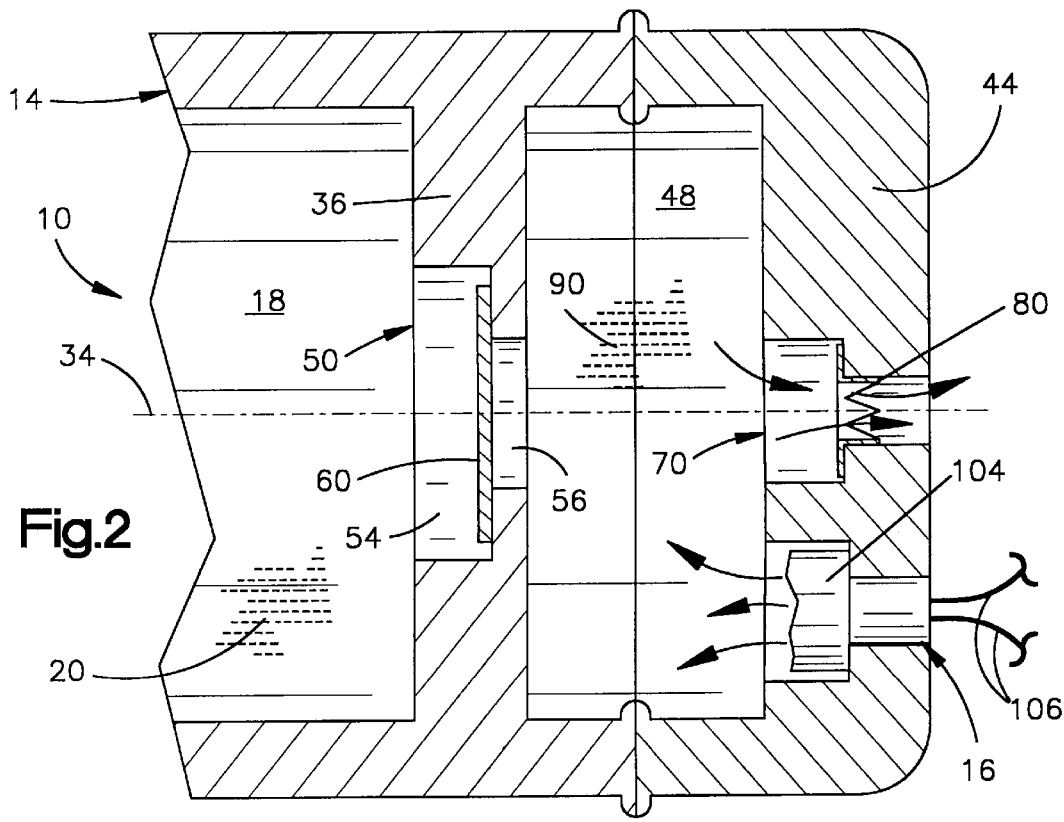
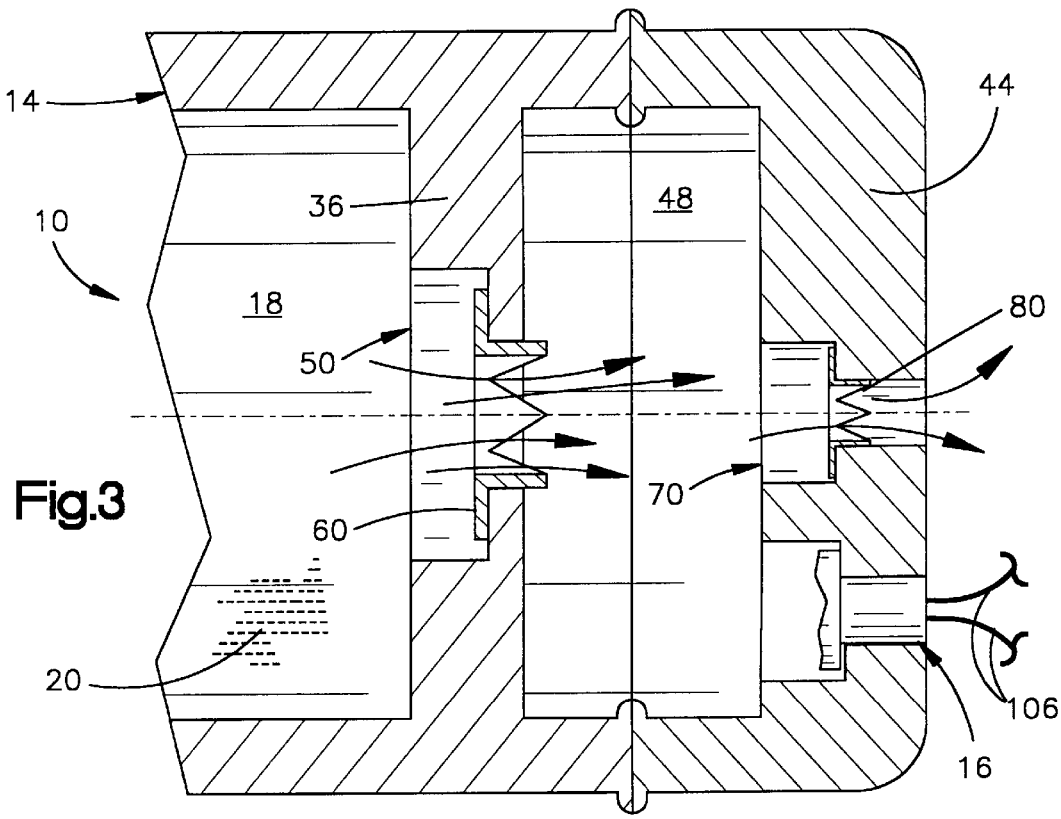

AIR BAG INFLATOR

BACKGROUND OF THE INVENTION

1. Technical Field

The present invention relates to an apparatus for inflating an inflatable vehicle occupant protection device. In particular, the present invention relates to an inflator for an inflatable protection device, such as an air bag.

2. Description of the Prior Art

It is known to inflate an air bag to help protect an occupant of a vehicle in the event of a vehicle collision. The air bag is inflated by a flow of inflation fluid, such as gas, under pressure from an inflator. When the air bag is inflated, the material of the air bag moves outward toward the vehicle occupant. If the vehicle occupant is closer than desired to the inflating air bag, it is known to inflate the air bag less forcefully at first, so as to help reduce the possibility of injury to the occupant. The inflator directs a relatively low pressure flow of inflation fluid into the air bag during an initial phase of inflation. The flow rate increases during a later phase of inflation of the air bag.

SUMMARY OF THE INVENTION

The present invention is an apparatus for inflating an inflatable vehicle occupant protection device. The apparatus comprises an inflator structure defining a primary chamber, a secondary chamber, a primary outlet for enabling fluid flow from the primary chamber to the secondary chamber, and a secondary outlet for directing fluid flow from the secondary chamber to the inflatable device. A primary burst disk extends across the primary outlet. The primary burst disk is rupturable in response to the pressure differential across the primary burst disk exceeding a first predetermined pressure differential. A secondary burst disk extends across the secondary outlet and is rupturable in response to the pressure differential across the secondary burst disk exceeding a second predetermined pressure differential.

The apparatus also comprises inflation fluid at a first pressure in the primary chamber, and inflation fluid in the secondary chamber at a second pressure less than the first pressure, so that the pressure differential across the primary burst disk is less than the first predetermined pressure differential. The apparatus further comprises actuatable means for rupturing the secondary burst disk to initiate flow of inflation fluid out of the secondary chamber into the inflatable device. The flow of fluid from the secondary chamber decreases the pressure in the secondary chamber sufficiently to raise the pressure differential across the primary burst disk to a level exceeding the first predetermined pressure differential.

In a preferred embodiment, the secondary burst disk is rupturable in response to the pressure differential across the secondary burst disk exceeding a second predetermined pressure differential. The actuatable means for rupturing the secondary burst disk comprises an energizable device for, when energized, increasing the pressure in the secondary chamber to a level exceeding the second predetermined pressure differential, thereby effecting rupturing of the secondary burst disk.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a view similar to FIG. 1 showing the inflator in a partially actuated condition;

FIG. 3 is a view similar to FIG. 2 showing the inflator in a fully actuated condition.

DESCRIPTION OF A PREFERRED EMBODIMENT

The present invention relates to an apparatus for inflating an inflatable vehicle occupant protection device. In particular, the present invention relates to an inflator for an inflatable protection device, such as an air bag. Other inflatable vehicle occupant protection devices that can be used in accordance with the invention include, for example, inflatable seat belts, inflatable knee bolsters, inflatable head liners or side curtains, and knee bolsters operated by inflatable air bags.

Figure 1:
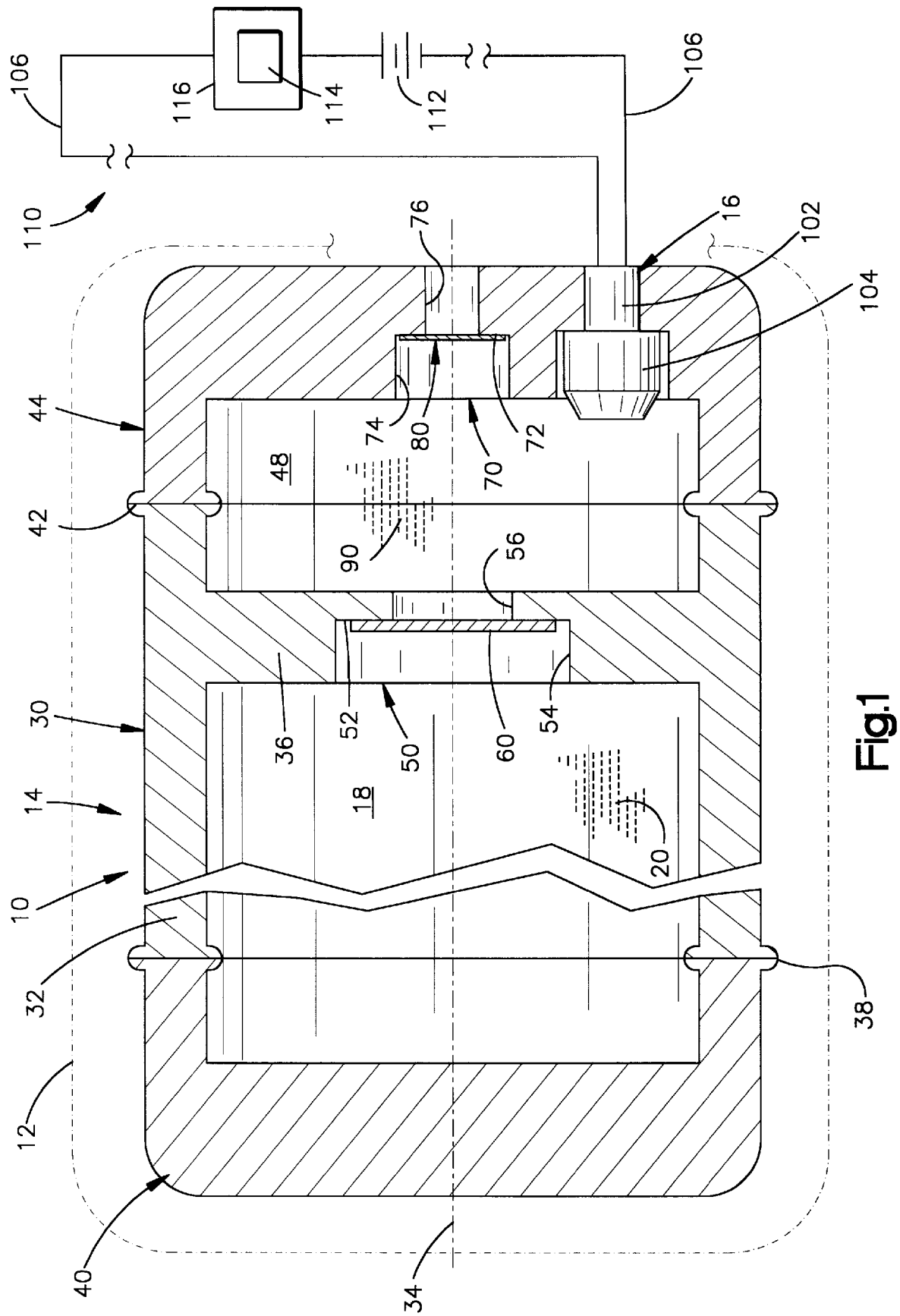
FIG. 1 is a longitudinal sectional view of an inflator in accordance with the present invention, shown in an unactuated condition.

As representative of the present invention, FIG. 1 illustrates an air bag inflator 10. The inflator 10 comprises a source of inflation fluid for an inflatable vehicle occupant protection device such as an air bag 12. The inflator 10 includes an inflator structure or container 14 and an initiator 16. The container 14 defines a primary chamber 18 storing pressurized inflation fluid 20. When the initiator 16 is actuated, the container 14 is opened, in a manner described below, to initiate an outlet flow of inflation fluid 20.

The container 14 has a central body portion 30 including a cylindrical side wall 32 centered on an axis 34 of the inflator 10. The central body portion 30 also includes a circular, internal central wall 36 of the inflator 10 disposed closer to one end of the central body portion than to the other end. A first friction weld 38 fixes and seals a first end wall 40 of the container 14 to the central body portion 30 of the container at its end that is farther from the central wall 36. A second friction weld 42 fixes and seals a second end wall 44 of the container 14 to the central body portion 30 of the container at its end that is closer to the central wall 36.

The primary chamber 18 extends axially between the central wall 36 and the first end wall 40 of the container 14. A secondary chamber 48 in the inflator 10 extends axially between the central wall 36 and the second end wall 44 of the container 14. The volume of the primary chamber is greater than the volume of the secondary chamber.

The central wall 36 of the container 14 has an opening that provides a primary fluid outlet 50. An annular shoulder surface 52 facing inward of the chamber 18 extends radially between a larger diameter portion 54 and a smaller diameter portion 56 of the primary fluid outlet 50. The primary fluid outlet 50 enables flow of inflation fluid 20 from the primary chamber 18 to the secondary chamber 48.

A rupturable primary closure disk or primary burst disk 60 extends across the primary outlet 50 to block the inflation fluid 20 from flowing outward. The closure disk 60 overlies the shoulder surface 52, and is fixed and sealed to the outlet wall 36 in a manner not shown, such as by welding. The primary burst disk 60 is in fluid communication with the secondary chamber through the smaller diameter portion 56 of the primary fluid outlet. The primary burst disk 60 may alternatively be a thin-walled section of the central wall 36, rather than a separate member covering an opening in the central wall."

The inflation fluid 20 stored in the primary chamber 18 preferably consists essentially of helium or argon at a storage pressure within the range of about 4,000 psi to about 7,000 psi. However, the inflation fluid 20 may have any other composition and storage pressure suitable for inflating an air bag or other vehicle occupant protection device.

The second end wall 44 of the container 14 defines a single inflation fluid exit opening 70. The exit opening 70 is the only opening through which the inflation fluid can exit the secondary chamber 48 and, thereby, the inflator 10. An annular shoulder surface 72 facing inward of the secondary chamber 48 extends radially between a larger diameter portion 74 and a smaller diameter portion 76 of the fluid exit opening 70. The diameter of the portion 76 of the opening 70 is relatively small compared to the diameter of the container 14.

A rupturable secondary closure disk or secondary burst disk 80 extends across the fluid exit opening 70. The secondary burst disk 80 overlies the shoulder surface 72, and is fixed and sealed to the second end wall 44 in a manner not shown, such as by welding. The secondary burst disk 80 is in fluid communication with the air bag 12 through the smaller diameter portion 76 of the fluid exit opening 70. The secondary burst disk 80 may alternatively be a thin-walled section of the second end wall 44, rather than a separate member covering an opening in the second end wall.

A second quantity of inflation fluid 90 is stored under pressure in the secondary chamber 48. The inflation fluid 90 in the secondary chamber 48 preferably has the same composition as the inflation fluid 20 in the primary chamber 18. The inflation fluid 90 in the secondary chamber 48 is at a storage pressure within the range of about 1,000 psi to about 4,000 psi.

A pressure differential exists across the primary burst disk 60 when the inflator 10 is in the unactuated condition shown in FIG. 1 because the inflation fluid 20 in the primary chamber 18 is maintained at a higher pressure than the inflation fluid 90 in the secondary chamber 48. The primary burst disk 60 is rupturable when the pressure differential across the primary burst disk exceeds a first predetermined pressure differential. When the inflator 10 is in the unactuated condition shown in FIG. 1, the pressure differential across the primary burst disk 60 is less than the first predetermined pressure differential, and the primary burst disk 60 does not rupture.

A pressure differential also exists across the secondary burst disk 80 when the inflator 10 is in the unactuated condition shown in FIG. 1 because the exterior of the inflator is at ambient air pressure. The secondary burst disk 80 is rupturable when the pressure differential across the secondary burst disk exceeds a second predetermined pressure differential. When the inflator 10 is in the unactuated condition shown in FIG. 1, the pressure differential across the secondary burst disk 80 is less than the second predetermined pressure differential, and the secondary burst disk does not rupture.

The initiator 16 is mounted in an initiator opening 102 in the second end wall 44. The initiator opening 102 is spaced apart from the fluid exit opening 70. The initiator 16 is an electrically actuatable device which is known as a squib, and has a casing 104 containing a small charge of pyrotechnic material. The pyrotechnic material is ignitable in a known manner upon the passage of electric current through the squib 16 between a pair of electrodes or lead wires 106 projecting from the casing 104. When the pyrotechnic material is ignited, it rapidly produces hot combustion products that are spewed outward from the casing 104 into the secondary chamber 48.

As shown schematically in FIG. 1, the initiator 16 is included in an electrical circuit 110 with a power source 112, which preferably comprises the vehicle battery and/or a capacitor, and a normally open switch 114. The switch 114 is part of a sensor 116 which senses one or more vehicle conditions that indicate the occurrence of a crash. Such a sensor is known in the art.

The sensor 116 may sense a crash-indicating condition that meets or exceeds a predetermined threshold level. This indicates the occurrence of a crash having a level of severity for which it is desirable to inflate the air bag 12 or other vehicle occupant protection device associated with the inflator 10. The switch 114 then closes, and electric current is directed through the squib 16 to ignite the pyrotechnic material in the casing 104.

When the inflator 10 is thus actuated, the ignited pyrotechnic material in the initiator 16 produces hot combustion products which rupture and emerge from the casing 104 within the secondary chamber 48. The combustion products heat and pressurize the inflation fluid 90 in the secondary chamber 48. The pressure in the secondary chamber 48 increases sufficiently that the pressure differential across the secondary burst disk 80 exceeds the second predetermined pressure differential. The secondary burst disk 80 ruptures, as illustrated schematically in FIG. 2. The inflation fluid 90 flows out of the secondary chamber 48 through the fluid exit opening 70.

The flow of inflation fluid 90 from the secondary chamber 48 decreases the pressure in the secondary chamber. After a relatively short period of time, such as up to about ten milliseconds, the pressure in the secondary chamber 48 decreases sufficiently that the pressure differential across the primary burst disk 60 exceeds the first predetermined pressure differential. The primary burst disk 60 ruptures, as schematically illustrated in FIG. 3. The inflation fluid 20 flows out of the primary chamber 18 through the primary outlet opening 50. The inflation fluid 20 flows through the secondary chamber 48 and exits the inflator 10 through the fluid exit opening 70, to inflate the air bag 12.

During the period of time between the rupturing of the secondary burst disk 80 and the rupturing of the primary burst disk 60, only the inflation fluid 90 from the secondary chamber 48 flows into the air bag 12. Therefore, the initial flow of inflation fluid into the air bag 12 is at a relatively low rate and pressure, because the secondary chamber 48 is relatively small and the inflation fluid 90 is stored in the secondary chamber at a relatively low pressure. The flow of inflation fluid 20 into the air bag 12, after rupturing of the primary burst disk 60, is at a relatively high rate and pressure, because the inflation fluid 20 is stored in the primary chamber 18 at a relatively high pressure.

Figure 4:
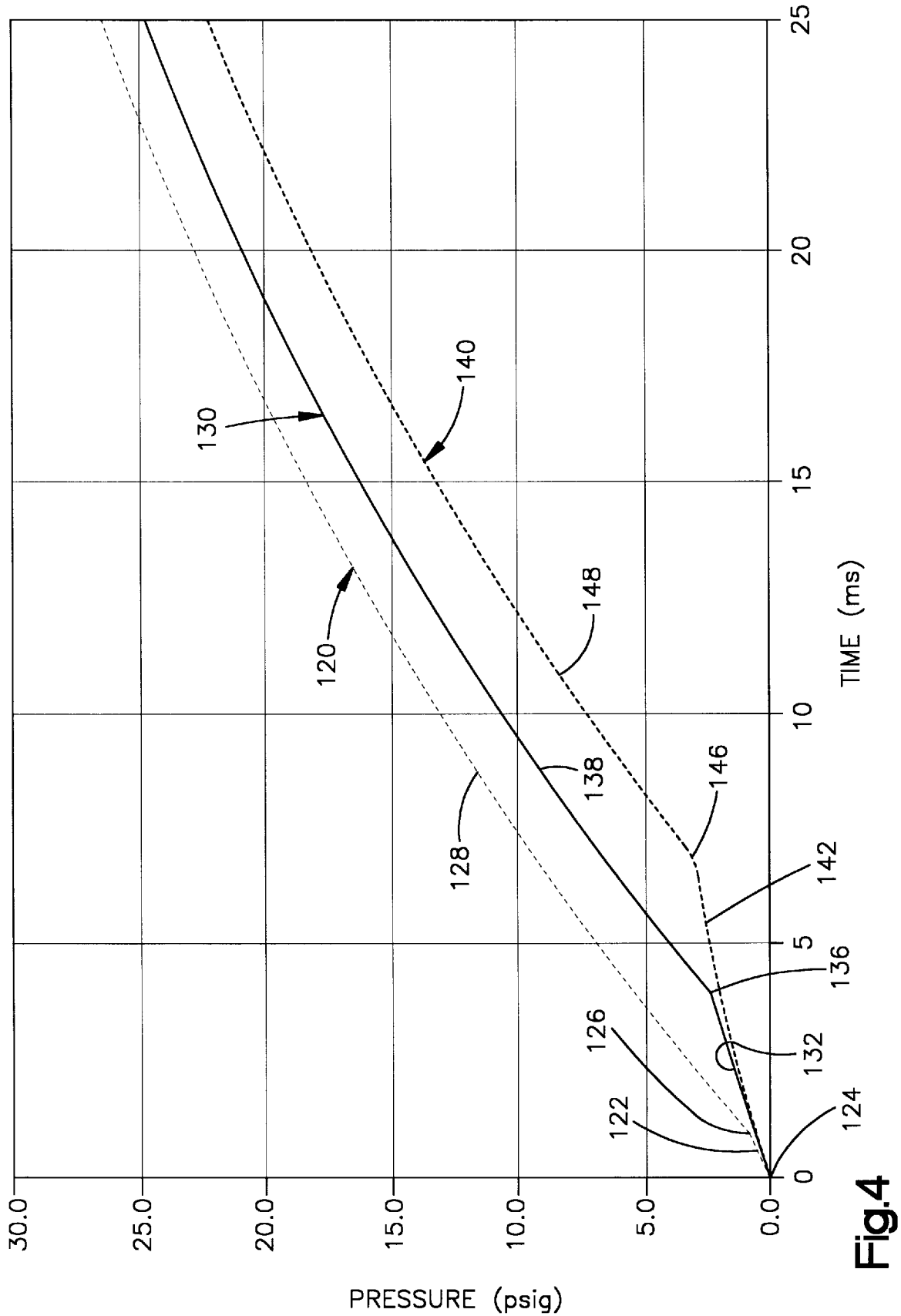
FIG. 4 is a graph plotting output levels of several inflators in accordance with the present invention.

FIG. 4 shows three curves 120, 130 and 140 which represent graphically the predicted tank output pressure, as a function of time, of three different inflators constructed in accordance with the invention. The differences between the three curves 120, 130 and 140 result from variations in the volume of the secondary chamber 48; other factors, such as the pressure in the secondary chamber and the pressure in the primary chamber 18, are constant.

The upper curve 120 in FIG. 4 represents tank output pressure of an inflator 10 having a secondary chamber of about 10 cc volume. The middle curve 130 represents tank output pressure of an inflator 10 having a secondary chamber of about 50 cc volume. The lower curve 140 represents tank output pressure of an inflator 10 having a secondary chamber of about 100 cc volume.

The upper curve 120 has a first portion 122 extending from the origin 124 to the point labeled 126, and a second portion 128 extending out from the point 126. The first portion 122 of the upper curve 120 represents tank output pressure of the inflator 10 as a function of time when only the secondary burst disk 80 is ruptured. The second portion 128 of the upper curve 120 represents tank output pressure of the inflator 10 as a function of time after the primary burst disk 60 is also ruptured. In the curve 120, the overall pressure versus time curve starts relatively shallowly, providing "soft" inflation of the air bag 12, then steepens after a predetermined period of time.

The middle curve 130 has a first portion 132 extending from the origin 124 to the point labeled 136, and a second portion 138 extending out from the point 136. The first portion 132 of the middle curve 130 represents tank output pressure of the inflator 10 as a function of time when only the secondary burst disk 80 is ruptured. The second portion 138 of the middle curve 130 represents tank output pressure of the inflator 10 as a function of time after the primary burst disk 60 is also ruptured. The shallow first portion 132 of the curve 130 persists for a longer period of time than does the shallow first portion 122 of the upper curve 120. This difference results from the larger volume of the secondary chamber 48 in the inflator for which the test output is represented by the middle curve 130.

The lower curve 140 has a first portion 142 extending from the origin 124 to the point labeled 146, and a second portion 148 extending out from the point 146. The first portion 142 of the lower curve 140 represents tank output pressure of the inflator 10 as a function of time when only the secondary burst disk 80 is ruptured. The second portion 148 of the lower curve 140 represents tank output pressure of the inflator 10 as a function of time after the primary burst disk 60 is also ruptured. The shallow first portion 142 of the curve 140 persists for a longer period of time than does the first portion 132 of the middle curve 130. This difference results from the larger volume of the secondary chamber in the inflator for which the test output is represented by the lower curve 140.

In inflators constructed in accordance with the present invention, the output pressure curve is a function of the relative volumes of the primary and secondary chambers 18 and 48, as well as the relative fluid pressures in the primary and secondary chambers. It is believed that typical ratios of the volume of the primary chamber to the volume of the secondary chamber can be in the range of about 10:1 to about 20:1. The pressure in the primary chamber 18 can range from about 4,000 psi to about 7,000 psi or more, while the pressure in the secondary chamber can range from about 1,000 psi to a level equivalent to the pressure in the primary chamber. These numbers are not intended to be limiting of the scope of the present invention, but only illustrative.

From the above description of the invention, those skilled in the art will perceive improvements, changes and modifications of the invention. Such improvements, changes and modifications within the skill of the art are intended to be covered by the appended claims.

Having described the invention, I claim:

1. An apparatus for inflating an inflatable vehicle occupant protection device, said apparatus comprising:

an inflator structure defining a primary chamber, a secondary chamber, a primary outlet for enabling fluid flow from said primary chamber to said secondary chamber, and a secondary outlet for directing fluid flow from said secondary chamber to the inflatable device;

a primary burst disk extending across said primary outlet and being rupturable in response to a pressure differential across said primary burst disk exceeding a first predetermined pressure differential;

a secondary burst disk extending across said secondary outlet and being rupturable in response to a pressure differential across said secondary burst disk exceeding a second predetermined pressure differential;

inflation fluid at a first pressure in said primary chamber;

inflation fluid in said secondary chamber at a second pressure less than said first pressure so that said pressure differential across said primary burst disk is less than said first predetermined pressure differential; and actuatable means for rupturing said secondary burst disk to initiate flow of inflation fluid out of said secondary chamber into the inflatable device;

the flow of fluid from said secondary chamber decreasing said second pressure in said secondary chamber sufficiently to raise said pressure differential across said primary burst disk to a level exceeding said first predetermined pressure differential.

2. An apparatus as set forth in claim 1 wherein said actuatable means for rupturing said secondary burst disk comprises an energizable device for, when energized, increasing said pressure in said secondary chamber to a level exceeding said second predetermined pressure differential, thereby effecting rupturing of said secondary burst disk while not effecting rupturing of said primary burst disk.

3. An apparatus as set forth in claim 2 wherein said energizable device comprises an initiator for, when energized, generating fluid combustion products and directing said fluid combustion products into said secondary chamber thereby to increase said pressure in said secondary chamber to a level exceeding said second predetermined pressure differential.

4. An apparatus as set forth in claim 3 wherein said initiator is mounted in an initiator opening in an end wall of said inflator structure, said end wall defining said secondary outlet, said initiator opening being spaced apart from said secondary outlet.

5. An apparatus as set forth in claim 1 wherein a ratio of the volume of said primary chamber to the volume of said secondary chamber is in a range from about 10:1 to about 20:1.

6. An apparatus as set forth in claim 5 wherein said pressure in said primary chamber is in a range from about 4,000 psi to about 7,000 psi or more, and said pressure in said secondary chamber is in a range from about 1,000 psi to a level equivalent to said pressure in said primary chamber.

7. An apparatus as set forth in claim 1 wherein said pressure in said primary chamber is in a range from about 4,000 psi to about 7,000 psi or more, and said pressure in said secondary chamber is in a range of from about 1,000 psi to a level equivalent to said pressure in said primary chamber.

8. An apparatus for inflating an inflatable vehicle occupant protection device, said apparatus comprising:

a primary chamber having an outlet opening and a primary burst disk extending across said outlet opening and blocking fluid flow from said primary chamber;

said primary burst disk being rupturable in response to a pressure differential across said primary burst disk exceeding a predetermined pressure differential; and means for rupturing said primary burst disk, said means comprising a secondary chamber and means for exhausting the secondary chamber thereby to increase said pressure differential across said primary burst disk to an amount above said predetermined pressure differential.

9. An apparatus as set forth in claim 8 wherein said means for exhausting the secondary chamber comprises a secondary burst disk closing said secondary chamber and means for pressurizing said secondary chamber to rupture said secondary burst disk and thereby to exhaust said secondary chamber prior to rupturing said primary burst disk.

10. An apparatus as set forth in claim 8 wherein said means for pressurizing comprises an initiator for, when energized, generating fluid combustion products and directing said fluid combustion products into said secondary chamber thereby to increase said pressure in said secondary chamber to a level exceeding said second predetermined pressure differential.

* * * * *